United States Patent [19]

Villata

[11] Patent Number: 5,655,639

[45] Date of Patent: Aug. 12, 1997

[54] MOTOR VEHICLE HYDRAULIC CLUTCH ASSEMBLY OF THE PULL TO RELEASE TYPE

[75] Inventor: Gino Villata, Buttigliera d'Asti, Italy

[73] Assignee: Valeo, Paris, France

[21] Appl. No.: 448,364

[22] PCT Filed: Sep. 20, 1994

[86] PCT No.: PCT/FR94/01095

§ 371 Date: May 26, 1995

§ 102(e) Date: May 26, 1995

[87] PCT Pub. No.: WO95/09312

PCT Pub. Date: Apr. 6, 1995

[30] Foreign Application Priority Data

Sep. 29, 1993 [FR] France .................. 93 11575

[51] Int. Cl.$^6$ .................. F16D 25/08; F16D 23/14
[52] U.S. Cl. .................. 192/85 CA; 192/98; 192/DIG. 1
[58] Field of Search .................. 192/70.13, 85 CA, 192/91 A, 98, DIG. 1, 112

[56] References Cited

U.S. PATENT DOCUMENTS

| | | |
|---|---|---|
| 3,955,660 | 5/1976 | Poon et al. . |
| 4,399,898 | 8/1983 | Olschewski et al. .................. 192/98 |
| 4,502,583 | 3/1985 | Limbacher .................. 192/98 |
| 4,687,084 | 8/1987 | Leigh-Monstevens et al. ... 192/85 CA |
| 5,113,989 | 5/1992 | Feigler . |
| 5,183,141 | 2/1993 | Abe et al. . |

FOREIGN PATENT DOCUMENTS

| | | |
|---|---|---|
| 0497164 | 8/1992 | European Pat. Off. . |
| 2304826 | 10/1976 | France . |
| 2517000 | 5/1983 | France . |
| 2815971 | 10/1979 | Germany . |
| 62-188822 | 8/1987 | Japan .................. 192/98 |
| 3-186620 | 8/1991 | Japan . |
| 2046864 | 11/1980 | United Kingdom .................. 192/98 |
| 2087026 | 5/1982 | United Kingdom . |
| 2098697 | 11/1982 | United Kingdom .................. 192/91 A |

*Primary Examiner*—Richard M. Lorence
*Attorney, Agent, or Firm*—Longacre & White

[57] ABSTRACT

A friction clutch assembly, especially for a motor vehicle, of the pull to release type comprising a clutch casing (10), within which there is arranged a device (20) for controlling declutching, which comprises a clutch release bearing and a hydraulic actuating device (26, 34) comprising at least one actuating piston (34), which is arranged to urge the clutch release bearing axially in a first direction (F1) so as to cause the clutch to be disengaged when the hydraulic actuating device is supplied with fluid under pressure. The casing (10) has a window (54) to enable a removable tool (58) to be introduced for mechanical actuation of the release bearing (20), so as to urge the latter axially in a second direction (F2) opposite to the first direction (F1). The end portion (60) of the removable tool (58) lying within the casing (10) cooperates with a complementary portion (62) of the actuating piston (26, 34).

10 Claims, 2 Drawing Sheets

MOTOR VEHICLE HYDRAULIC CLUTCH ASSEMBLY OF THE PULL TO RELEASE TYPE

BACKGROUND OF THE INVENTION

1. Field of the Invention

The present invention relates to a friction clutch assembly, especially for a motor vehicle.

2. Description of Related Art

More particularly, the invention relates to a clutch of the pull to release type, one embodiment of which is described and shown in the document FR-A-2 304 826.

Such a type of clutch includes a friction disc which is fixed releasably to, but for rotation with, a rotatable drive shaft, a control member which is adapted to control the disengagement of the friction disc from the drive shaft when an axial tractive force is exerted on it, and a clutch release bearing which is arranged to work axially in traction on the control member of the clutch.

Such a clutch, as is disclosed in the document FR-A-2 304 826, may be of the mechanically controlled type, that is to say of the type that includes a declutching control fork which is made in the form of a lever pivoted on the clutch casing, and of which the inner end works axially on a sliding sleeve, one end of which is coupled axially, for example, to the outer ring of the rolling bearing which is part of the clutch release bearing.

As is disclosed in that document, the use of the mechanical declutching control fork in a direction opposite to that which produces disengagement of the clutch, enables fastening in axial traction to be obtained, during assembly of the engine unit, between an element which is coupled to the inner ring of the rolling bearing of the clutch release bearing and an actuating member which is engaged with the declutching levers or diaphragm that form part of the clutch, this fastening being obtained by a resilient mating effect which may also be referred to as clipping.

Various different designs of clutch are also known which include a hydraulic actuating device that comprises at least one actuating piston, one end of which works on the clutch release bearing in order to urge the clutch release bearing axially in a first direction, so as to disengage the clutch when the hydraulic actuating device is supplied with fluid from a source of fluid under pressure, such as for example a clutch cylinder.

One example of such a hydraulically actuated clutch is described and shown in the document U.S. Pat. No. 3,955,660, in which the actuating piston is made in the form of a cylindrical sleeve, which is mounted for sliding movement on a cylindrical guide surface fixed to the clutch casing.

Such a type of hydraulically actuated clutch, which no longer has any mechanical fork for actuating the clutch release bearing, does not enable initial fastening to be obtained by resilient clipping effect between the output member of the clutch release bearing and the actuating member.

SUMMARY OF THE INVENTION

An object of the present invention is to propose a new design for a hydraulically actuated clutch assembly of the pull to release type, which overcomes the drawbacks mentioned above.

To this end, the invention proposes a friction clutch assembly of the pull to release type, especially for a motor vehicle, comprising a clutch casing within which there is arranged a clutch control device, which comprises a clutch release bearing and a hydraulic actuating device comprising at least one actuating piston, one end of which works on the clutch release bearing in order to urge the said release bearing axially in a first direction, so as to cause disengagement of the clutch to take place when the hydraulic actuating device is supplied with fluid under pressure, characterised in that the casing has an aperture to enable a removable tool to be introduced for mechanical actuation of the release bearing, whereby to urge the latter axially by means of the actuating piston, in a second direction opposite to the first direction, and in that the end portion of the removable tool situated inside the casing cooperates with a complementary portion of the actuating piston.

The invention enables initial assembly together to be obtained, in a simple and inexpensive manner by elastic clipping, between the output member of the clutch release bearing and the actuating member.

In accordance with other features of the invention:

- the removable tool is a lever, the body portion of which engages against an edge, in facing relationship therewith, of the aperture of the casing;
- the end portion of the tool lying within the casing (10) is received in a complementary recess formed at the peripheral surface of the piston;
- the peripheral surface of the piston has a series of adjacent recesses arranged in a crown formation;
- each recess is bounded laterally by two separating elements parallel to the axis of the piston, and axially by a base at right angles to the axis of the piston;
- the end portion of the tool working inside the casing is made in the form of a fork, each of the branches of which includes a peg which is received in a recess formed at the peripheral surface of the piston;
- the two recesses which receive the pegs are diametrically opposed to each other;
- one of the axial ends of the actuating piston is connected to the outer ring of the rolling bearing of the clutch release bearing by means of a seamed shroud piece, which lies in line with an external radial collar portion formed at the said axial end of the piston;
- the base of each recess consists of the radial surface, in facing relationship, of the collar portion of the actuating piston;
- each recess is bounded laterally by the edges, in facing relationship with each other, of two adjacent lugs which extend axially from the body portion of the seamed shroud piece;
- each recess is bounded laterally by two separating elements, formed on the peripheral surface of the piston and extending axially from the said radial face of the collar portion.

BRIEF DESCRIPTION OF THE DRAWINGS

Further features and advantages of the invention will appear on a reading of the detailed description which follows, for an understanding of which reference is made to the attached drawings, in which.

DETAILED DESCRIPTION OF PREFERRED EMBODIMENT

Figure 1:
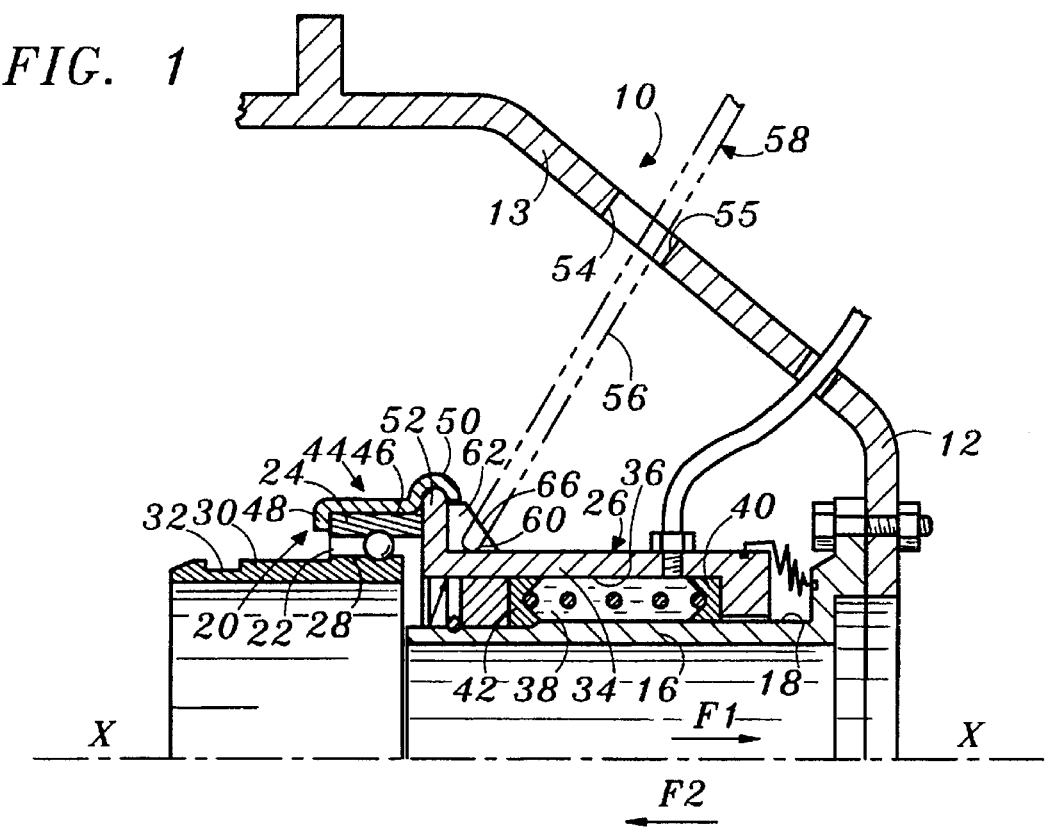
FIG. 1 is a diagrammatic view in axial cross section, showing part of a clutch casing and all actuating device for the clutch release bearing, made in accordance with the invention.

In all of the drawings, parts which are identical or similar to each other are indicated by the same reference numerals.

Not all of the clutch is shown in the drawings, and it will not be described in detail, and reference can be made, in particular, to the documents mentioned above for particulars of various embodiments.

It will be recalled that a motor vehicle clutch commonly comprises a friction disc, having friction liners at its outer periphery, a reaction plate, a pressure plate which is movable axially with respect to the reaction plate, a cover plate fixed to the reaction plate, and axially acting resilient means which bear on the cover plate and on the pressure plate in order to clamp the friction liners between the pressure plate and the reaction plate, which are fixed with respect to the crankshaft of the engine for rotation with it, while the friction disc is mounted on the input shaft of the gearbox for rotation with the latter.

The axially acting resilient means are part of the declutching device of the clutch, and comprise either a diaphragm, as in the document FR-A-2 304 826, or coil springs associated with declurching levers as in the document U.S. Pat. No. 3,995,660.

It will be recalled that, in a diaphragm clutch of the pull to release type, the said diaphragm engages on the cover plate through the outer peripheral portion of its Belleville ring, and, through the inner periphery of its said Belleville ring, on an engagement land, which is commonly of divided form, of the reaction plate.

An actuating member is associated with the declutching levers or diaphragm, and to disengage, or declutch, the clutch it is necessary to work in traction on the actuating member by means of a clutch release bearing which is connected to the actuating member.

Actuation of the release bearing is obtained by means of a hydraulic actuating device which comprises, in a manner described below, an axially movable piston 26, 34, a guide member 16 which is fixed axially, a hydraulic chamber 38, for the actuating piston 26, 34 and delimited by the guide mender 16 and by the said piston, and a pressurised fluid supply circuit which includes at least one feed duct that connects the actuating chamber for the piston with a pressure source, for example a clutch cylinder which is acted on by the clutch pedal.

The pressure source is arranged outside the casing 10 in a manner known per se.

This casing is generally in the form of a hood, and has a radial end wall 12, on the inner surface of which there is secured axially and in rotation a post 16 which is also referred to as a horn, and which delimits an external cylindrical engagement surface 18 having an axis X—X.

The casing encloses, in particular, a clutch release bearing 20 which consists essentially of a ball bearing 22, the outer ring 24 of which is coupled, in this example by seaming, to an actuating sleeve 26 for axial straight line movement with the latter, the rotatable inner ring 28 of the ball bearing being extended by a sleeve portion 30 which comprises, in particular, an external radial groove 32 which is arranged to receive means (not shown) for fastening, by resilient axial mating, to a coupling member which acts on the actuating member (not shown), as is described for example in the documents FR-A-2 304 826 and FR-A-2 653 195 (U.S. Pat. No. 5,113,989). In a manner known per se, the coupling member, for example a coupling ring, is resiliently deformable in the radial direction, and engages with the leading flank of the groove 32 and with a surface of the actuating member.

Actuation of the clutch release bearing 20 is obtained by means of a hydraulic actuating device which comprises an actuating piston consisting of the hollow cylindrical body 34 of the sleeve 26, the internal cylindrical surface 36 of which cooperates at its rear end with the cylindrical surface 18 so as to define a hydraulic actuating chamber 38.

The post 16 thus comprises a guide member for the piston 26, 34, and is in a piston and cylinder relationship with the said piston 26, 34.

It will be noted that the piston 26, 34 is arranged to act axially on the clutch release bearing 20, with the said piston having, in the manner mentioned above, an end portion which acts on the clutch release bearing 20. This release bearing 20 is coupled to the piston 26, 34 for axial straight line movement with it, being joined to the latter in this example by seaming.

This joint can of course be obtained by force-fitting the outer ring 24 of the release bearing 20 on to the associated end of the piston 26, 34, the said end being then provided with a shoulder as explained in the document DE-A-2 815 971.

As described in the document FR-A-2 304 826, it is of course possible to reverse the structures, with the internal ring of the release bearing 20 then being coupled axially to the piston 26, 34, while the outer ring of the release bearing 20 is rotatable, being connected to the actuating member in axial nesting relationship.

More precisely, the hydraulic actuating chamber 38 is delimited axially by two grooved rings 40 and 42, which are carried respectively by the piston 26, 34 and by the horn 16. For this purpose, the rear end portion of the piston 26, 34 includes a collar portion directed towards the axis of the assembly, while the post 16 carries a thrust ring which is located axially by means of a circlip.

The grooved rings 40, 42 bear respectively on the collar portion and on the thrust ring, with a sealing bellows being interposed between the rear end of the piston and that of the post 16.

A preloading spring is interposed between the grooved rings 40, 42 for urging the piston 26 towards the wall 12, and for exerting a force on the declutching device of the clutch in order to ensure proper operation of the ball bearing of the release bearing 20.

When the actuating chamber 38 is supplied with fluid under pressure, for example by a clutch cylinder (not shown) connected to the duct in FIG. 1 which passes through the portion 13, it produces an axial displacement of the piston 34 in the direction X—X and in the direction F1, from left to right in FIG. 1, so as to cause the clutch to be disengaged by means of the clutch release bearing 20.

The fastening between the outer ring 24 of the ball bearing 22 of the clutch release bearing 20 and the piston in the form of the sleeve 26, 34 is effected by means of a shroud piece 44 of pressed sheet metal, seamed over the sleeve 26.

The shroud piece 44 has an annular main skirt portion 46, a bent over, internal, first terminal radial edge portion 48 which cooperates with a radial surface of the outer ring 24 in facing relationship with it, and a bent over second radial edge portion 50 which overlies the portion, in line with it, of an external radial collar portion 52 that extends integrally in the radial direction from the axial end of the sleeve 34 of the piston 26.

In accordance with the invention, the conical portion 13 of the wall of the casing has an aperture 54, in this example in the form of a window 54, for enabling the body 56 of a removable tool 58 to pass through it, the tool being so designed as to displace the clutch release bearing mechanically, in the axial direction F2 opposite to the direction F1 of the hydraulic actuation.

The end of the tool 58, situated within the casing, cooperates with a complementary portion of the actuating piston 26, 34.

For this purpose, the end portion 60 of the removable tool 58 which is situated within the casing is arranged to be received in a recess 62 which is formed at the outer periphery of the sleeve 34.

As a result of this arrangement, the tool is applied circumferentially to the sleeve in such a way that the release bearing 20 is well and reliably fitted axially over its associated actuating member.

In the embodiment shown in FIG. 1, the tool 58 is shown in its simplest form, corresponding for example to a screwdriver, the body portion 56 of which is introduced into the casing through the window 54, with its end 60 being received in one recess 62.

Figure 2:
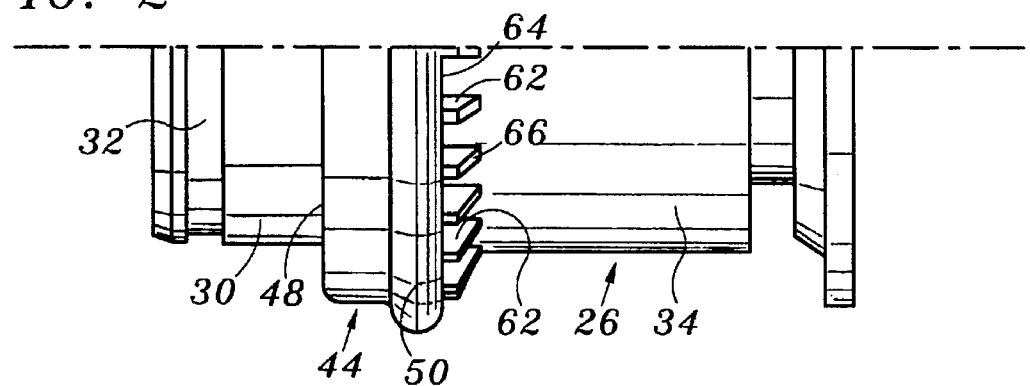
FIG. 2 is an external half view in axial cross section of the movable unit of the declutching control device.

In the embodiment shown in FIGS. 1 and 2, the sleeve 34 has a series of adjacent recesses 62 arranged in the form of a crown.

As can be seen in FIG. 2, each recess 62 is bounded axially by a portion of the surface 64 of the radial collar portion 52 in facing relationship, and laterally by the surfaces of two separating elements 66 which extend axially from the radial collar portion 52 towards the radial wall 12.

Preferably, the sleeve 34, with its separating element 66, is made by moulding, being for example of a plastics material reinforced by glass fibres or cast.

Thus, use is made, at low cost, of the sleeve 34, and especially of its collar portion 52.

The axial displacement of the clutch release bearing 20 in the direction F2 is obtained very easily by means of the tool 58, which is used as a lever by engaging it on the facing edge 55 of the rectangular window 54, and by exerting a moment which tends to cause the body portion 56 of the tool 58 to pivot in the clockwise direction in FIG. 1.

This facility for mechanical actuation of the piston by means of the tool 58 is employed during assembly of the clutch with a view to the fastening of the inner ring 28, 30 axially to the actuating member by means of a coupling member, using an axial mating technique such as is described and shown in the documents FR-A-2 304 826 and FR-A-2 653 195.

Figure 3:
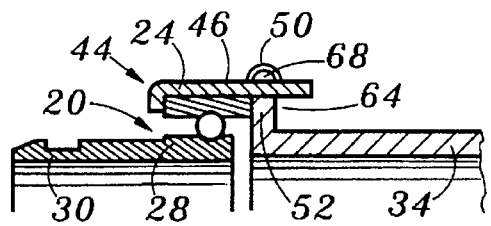
FIG. 3 is a view in axial cross section showing a modified embodiment of the movable unit of FIG. 1.
Figure 4:
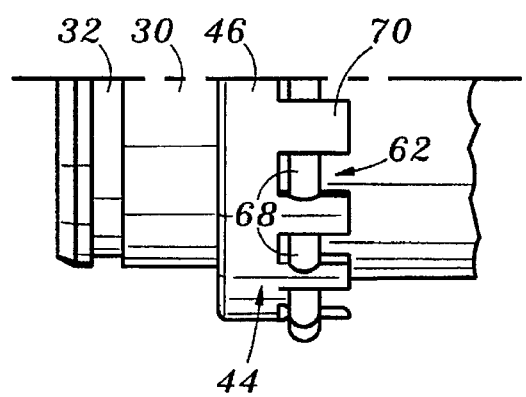
FIG. 4 is an external half view of the movable unit shown in FIG. 3.

In the modified embodiment shown in FIGS. 3 and 4, the external radial collar portion 52 of the sleeve 34 has indentations 68, into each of which there extends a lug 70 which is formed integrally, in this example by a pressing operation, with the body portion 46 of the seamed shroud piece 44.

Two adjacent axial lugs 70 form the sides of a recess 62 which is arranged to receive one end of a removable tool.

Figure 5:
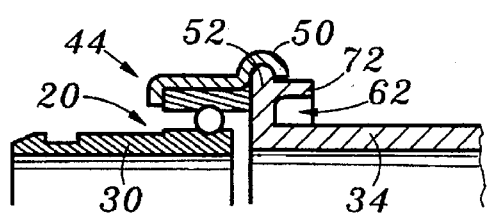
FIG. 5 is a view similar to that of FIG. 3, showing another embodiment of the movable unit.

In the embodiment shown in FIG. 5, the recesses 62 are made by integral moulding of the sleeve 34 with the external radial collar portion 52, and in addition they are bounded on their radially outward side by a complementary axial spacing element 72 which enables the end of a removable tool to be introduced, and which prevents escape of the latter during mechanical actuation of the piston 26.

Figure 6:
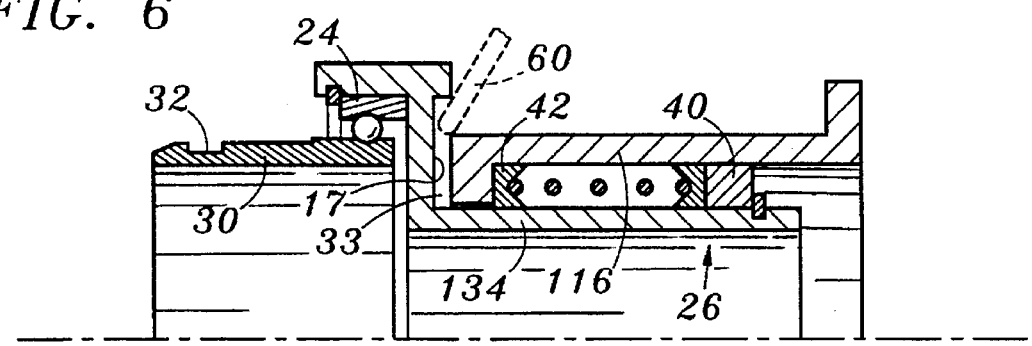
FIG. 6 is a partial view similar to that of FIG. 1, showing a modified embodiment of the hydraulic actuating device for the clutch release bearing.

In the embodiment shown in FIG. 6, the sleeve 134 is internal, being surrounded by the post 116 and the end portion 60 of the tool may be introduced between the edge 33 of the sleeve and the radial surface 17, in facing relationship with it, of the horn 16, within which the outer ring 24 of the ball bearing 22 is mounted.

Figure 7:
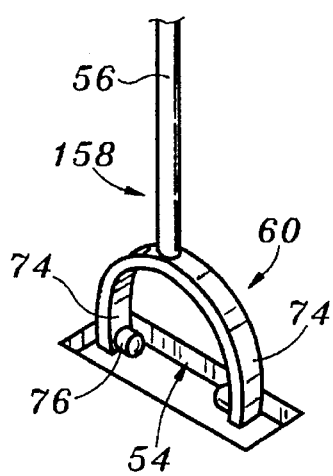
FIG. 7 is a diagrammatic perspective view showing one design, in the form of a fork made in one piece, of the removable actuating tool for the clutch release bearing.

FIG. 7 shows a fork-shaped tool 158, the body 56 of which, in the form of a bar, is extended by a lower end portion in the form of a fork 20, each of the branches 74 of which includes a drive peg 76, the two pegs being arranged to be received in diametrically opposed recesses 62 formed in the periphery of the sleeve 34 of the actuating piston. In the case of a tool 158 in the form of a rigid fork, such as is shown in FIG. 7, the rectangular window 54 is of course so dimensioned as to enable the fork-shaped end portion 60 to pass through it.

Figure 8:
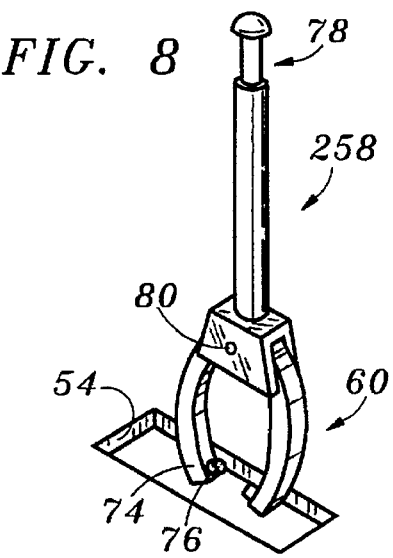
FIG. 8 is a view similar to that of FIG. 7, showing a modified embodiment of the removable fork.

In the embodiment shown in FIG. 8, the removable tool 258, again in the form of a fork, is made like sugar or ice cube tongs, that is to say it includes a mechanism 78 which enables the branches 74 to be moved towards and away from each other about a pivot axis 80, this design enabling the dimensions of the window 54 to be reduced.

In all cases, it is of course possible to reclose the aperture 54 after the clutch release bearing has been snap-fitted on to its actuating member (not shown) by means of the tool 58, 158, 258.

In every case, thanks to the recesses 62, the tool 58, 158, 258 is unable to escape during the axial fitting of the release bearing 20 on to its associated actuating member.

We claim:

1. A friction clutch assembly of the pull to release type, comprising a removable tool; a clutch casing (10) within which there is arranged a clutch control device, which comprises a clutch release bearing (20) and a hydraulic actuating device (26, 34) comprising at least one actuating piston (26, 34), one end of which works on the clutch release bearing (20) in order to urge said release bearing axially in a first direction (F1), so as to cause disengagement of the clutch when the hydraulic actuating device is supplied with fluid under pressure, wherein the casing (10) has an aperture (54) to enable the removable tool (58) to be introduced for mechanical actuation of the release bearing (20) in order to urge the release bearing axially in a second direction (F2) opposite to the first direction (F1) and in that an end portion (60) of the removable tool (58) situated inside the casing (10) is received in a complimentary recess (62) formed at a peripheral surface of the actuating piston (26, 34).

2. A clutch assembly according to claim 1, wherein the removable tool (58) is a lever, the body portion (56) of which engages against an edge (55), in facing relationship therewith, of the aperture (54) of the casing (10).

3. A clutch assembly according to claim 1, wherein the peripheral surface of the piston has a series of adjacent recesses (62) arranged in a crown formation.

4. A clutch assembly according to claim 1, wherein each adjacent recess (62) is bounded laterally by two separating elements (66) parallel to the axis (X—X) of the piston, and axially by a base (64) at right angles to the axis of the actuating piston.

5. A clutch assembly according to claim 1, wherein the end portion (60) of the tool working inside the casing (10) is made in the form of a fork, each of the branches (74) of which includes a peg (76) which is received in a recess (62) formed at the peripheral surface of the piston (26, 34).

6. A clutch assembly according to claim 5, wherein two recesses which receive the pegs (76) are diametrically opposed to each other.

7. A clutch assembly according to claim 1, one (35) axial end of the actuating piston (34) is connected to an outer ring (24) of a rolling bearing (22) of the clutch release bearing by a seamed shroud piece (44), which lies in line with an external radial collar portion (52) formed at said axial end (35) of the actuating piston (34).

8. A clutch assembly according to claim 7, wherein a base (64) of said recess (62) consists of a radial surface, in facing relationship of the collar portion (52) of the actuating piston (26, 34).

9. A clutch assembly according to claim 8, wherein said recess (62) is bounded laterally by edges, in facing relationship with each other, of two adjacent lugs (70) which extend axially from a body portion (46) of the seamed shroud piece (44).

10. A clutch assembly according to claim 9, wherein said recess (62) is bounded laterally by two separating elements, formed on the peripheral surface of the piston and extending axially from the collar portion (52) of the actuating piston (26, 34).

* * * * *